(12) United States Patent
Ducharme et al.

(10) Patent No.: US 9,058,297 B2
(45) Date of Patent: *Jun. 16, 2015

(54) DEVICE WITH PRIVILEGED MEMORY AND APPLICATIONS THEREOF

(71) Applicant: ViXS Systems, Inc., Toronto (CA)

(72) Inventors: Paul D. Ducharme, Richmond Hill (CA); Norman Vernon Douglas Stewart, Toronto (CA)

(73) Assignee: VIXS Systems, INC, Toronto, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/295,479

(22) Filed: Jun. 4, 2014

(65) Prior Publication Data

US 2015/0012756 A1    Jan. 8, 2015

Related U.S. Application Data

(63) Continuation of application No. 12/490,777, filed on Jun. 24, 2009, now Pat. No. 8,781,127.

(60) Provisional application No. 61/094,541, filed on Sep. 5, 2008.

(51) Int. Cl.
| | |
|---|---|
| *G06F 21/00* | (2013.01) |
| *G06F 12/14* | (2006.01) |
| *G06F 21/60* | (2013.01) |
| *G06F 21/62* | (2013.01) |
| *G06F 21/72* | (2013.01) |
| *G06F 21/79* | (2013.01) |

(52) U.S. Cl.
CPC .......... *G06F 12/1408* (2013.01); *G06F 21/602* (2013.01); *G06F 21/6209* (2013.01); *G06F 21/72* (2013.01); *G06F 21/79* (2013.01); *G06F 2221/2127* (2013.01); *G06F 21/00* (2013.01)

(58) Field of Classification Search
CPC ... G06F 21/602; G06F 21/6209; G06F 21/00; G06F 21/10; G06F 21/72; G06F 21/79; G06F 2221/2127; G06F 12/1408; H04L 9/08; H04L 9/30; H04L 9/083; H04L 63/0428
USPC ........................................................ 380/277
See application file for complete search history.

(56) References Cited

U.S. PATENT DOCUMENTS

| | | | |
|---|---|---|---|
| 6,845,160 B1 * | 1/2005 | Aoki | 380/286 |
| 2006/0117392 A1 * | 6/2006 | Courtin et al. | 726/27 |
| 2008/0109871 A1 * | 5/2008 | Jacobs | 726/1 |
| 2008/0219449 A1 * | 9/2008 | Ball et al. | 380/277 |

* cited by examiner

*Primary Examiner* — Yogesh Paliwal
(74) *Attorney, Agent, or Firm* — Garlick & Markison; Bruce E. Stuckman

(57) ABSTRACT

A device includes a key store memory, a rule set memory, a plurality of cryptographic clients, and a key store arbitration module. The key store memory stores a plurality of cryptographic keys and the rule set memory stores a set of rules for accessing the cryptographic keys. A cryptographic client is operable to issue a request to access a cryptographic key(s) and, when access to the cryptographic key is granted, execute a cryptographic function regarding at least a portion of the cryptographic key to produce a cryptographic result. The key store arbitration module is operable to determine whether the request to access the cryptographic key is valid; when the request is valid, interpret the request to produce an interpreted request; access the rule set memory based on the interpreted request to retrieve a rule of the set of rules; and grant access to the cryptographic key in accordance with the rule.

20 Claims, 8 Drawing Sheets

DEVICE WITH PRIVILEGED MEMORY AND APPLICATIONS THEREOF

CROSS REFERENCE TO RELATED PATENTS

The present U.S. Utility patent application claims priority pursuant to 35 U.S.C. §120 as a continuation of U.S. Utility application Ser. No. 12/490,777, entitled "DEVICE WITH PRIVILEGED MEMORY AND APPLICATIONS THEREOF", filed Jun. 24, 2009, issued as U.S. Pat. No. 8,781,127 on Jul. 15, 2014, which claims priority pursuant to 35 U.S.C. §119(e) to U.S. Provisional Application No. 61/094,541, entitled "METHODS FOR SYSTEM ON A CHIP CRYPTOGRAPHIC KEY ACCESS AND STORAGE", filed Sep. 5, 2008, both of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates to generally devices that include memory and more particularly to securing access to the memory within the device.

2. Description of Related Art

The desire to keep video content of DVD's (and/or other copyrighted or proprietary information that is stored in a digital format) secure from unauthorized use (e.g., unauthorized copying, distribution, etc.) is driven by a sector of the population that places little to no value on the intellectual properties rights of others. As such, the battle between creating security systems for digital information and the hackers that attempt to break them continues.

This battle is intensifying with the integration of electronic device features being implemented on a single device (e.g., computer with DVD functionality) and is further intensified by video processing hardware being implemented as stand-alone system on a chip (SOC) devices. In many instances, the video processing hardware SOC uses an operating system that allows end users to write their own applications, which means that the user's application may share the same processors and memory space as the security system. This makes the security operations vulnerable. To reduce the vulnerability, video processing hardware needs to be constrained to performing only specific intended types of cryptographic operations.

In addition, video processing devices, which include the video processing hardware SOC, are embedded with licensed secret keys for compliance with one or more of a plurality of video application standards (e.g., BD, DTCP, CPRM, Cable Card, etc.). Typically, such a video application standard includes a revocation mechanism whereby, if a secret key value is made public, the security functions of the compromised devices are revoked and the devices are rendered inoperable. As such, it is highly desirable that the secret keys are stored in such a way that they are not accessible to the firmware of the device (in order to avoid revocation). This is typically done by storing the secret keys in a one-time programmable (OTP) memory.

While using OTP memory has become a primary mechanism for storing secret keys within video processing devices, it is not a failsafe approach. For example, a security issue arises when multiple cryptographic clients (e.g., a hardware block that performs a specific cryptographic algorithm such as RSA, TSD, 1394, DMA, etc. . . . ) may issue read or write requests to the OTP memory asynchronously and that the requests are not atomic. In addition, as a result of granularity associated with OTP memory large key values are partitioned into smaller blocks, which have special read/write rules that are imposed on every block. Thus, it becomes necessary to associate a macro level restriction on cryptographic clients down to every micro level block access performed by the client.

As a specific example, the RSA algorithm can perform a 2048 bit RSA operation, which requires 32 reads of 64 bit blocks from the key store to assemble the exponent. If a key is intended to be used as a 2048 bit exponent, then every 64 bit block read must be associated with the intended purpose of the key; i.e. blocks have to have an attribute indicating which cryptographic client is permitted to access a particular block associated with a larger key.

Another security problem is that cryptographic strength often relies on using large keys (e.g., up to 2048 bits for RSA or 256 bit for some AES modes). However, if the large key is used one 64 bit block at a time by a weaker cryptographic client, then large keys may be attacked 64 bits (or less) a time. Yet another way to attack large keys is to overwrite portions of the key with 0's, and then perform the intended operations, but with the remainder of the weakened key. Every time a portion of the key is decimated in this way, the remainder can be determined because portions of the key are now known.

Still further, some cryptographic clients have the ability to perform operation at various levels of strength; for example, the RSA can be configured for variable size modulus or 3DES can be degraded into a DES operation. This can be exploited by a hacker to perform weaker operations and thereby attack large keys with degraded operations. Even further, some cryptographic clients use control words (CWs) and initial vectors (IVs) within the security operations. The integrity of a security system may be attacked by using a CW as an IV in an operation where the clear text and the CW are known, which could be used to reveal the CW value.

Another important aspect of maintaining the integrity of cryptographic operations is controlling the destination of the cryptographic operation results. For example, content exported from the SOC poses a far greater risk than content which is retained within the SOC. Yet another mode of attack involves using a key, a CW or an IV to decrypt content instead of encrypting the content. For example the intention may be to encrypt content however a hacker may use a key store value to decrypt the content.

In addition to the threat of hackers, the security of the secure content information is at risk from unauthorized public disclosure. For example, if a disgruntled employee posts the algorithm and location of the keys on the Internet, the security of the algorithm is lost. As such, the risk to security systems is not just from outsider breaking the security of the algorithm, but also from an insider intentionally compromising the integrity of the security system.

Therefore, a need exists for a security device architecture that at least partially overcomes one or more of the above mentioned security issues.

BRIEF DESCRIPTION OF THE SEVERAL VIEWS OF THE DRAWING(S)

DETAILED DESCRIPTION OF THE INVENTION

Figure 1:
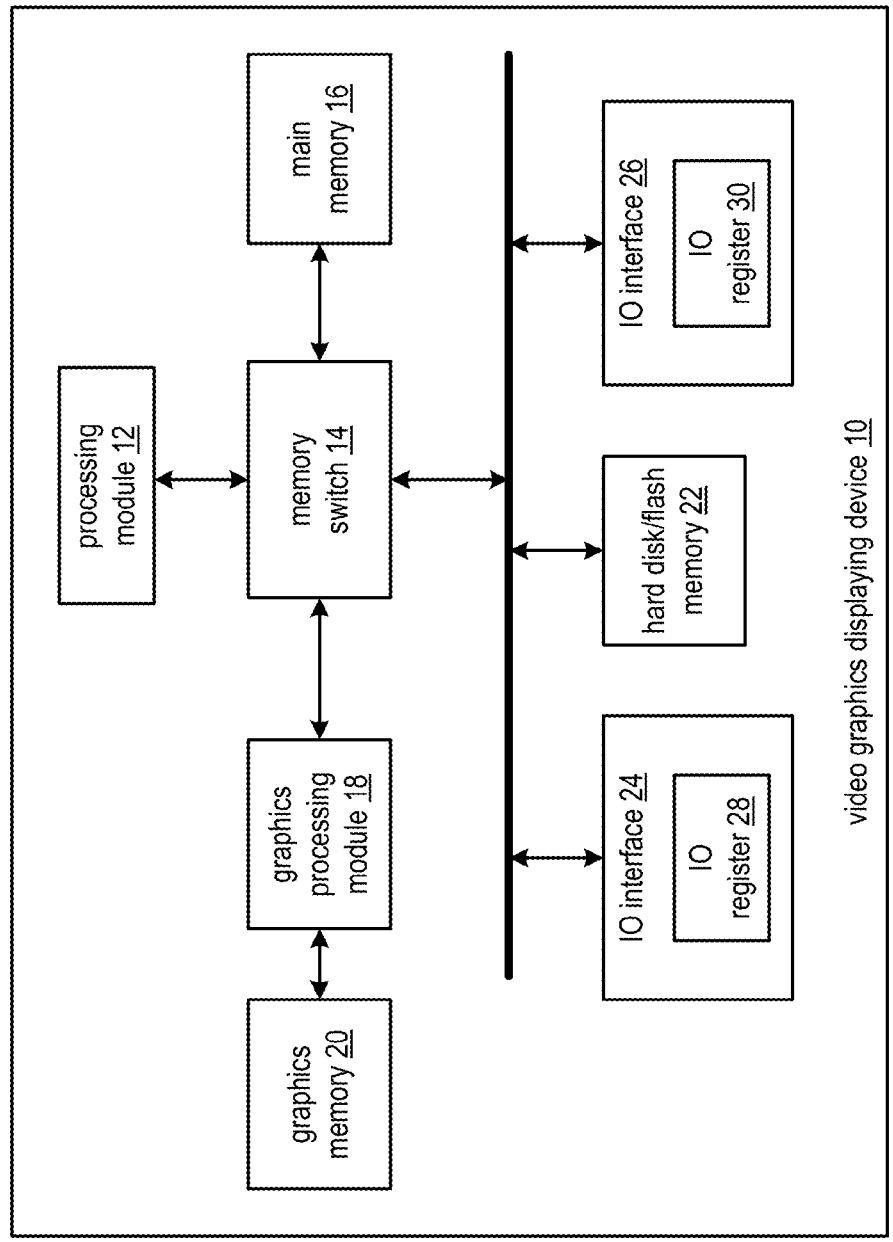
FIG. 1 is a schematic block diagram of an embodiment of a video graphics display device in accordance with the present invention.

FIG. 1 is a schematic block diagram of an embodiment of a video graphics display device 10 that includes a processing module 12, a memory switch 14, main memory 16, a graphics processing module 18, graphics memory 20, a hard disk and/or flash memory 22, and input/output (IO) interfaces 24 and 26. Each of the IO interfaces 24 and 26 includes an IO register 28 and 30, respectively. Note that the video graphics display device 10 may be a computer, a laptop computer, a DVD player, a portable digital audio/video player, etc. and may include multiple IO interfaces 24 and 26. Further note that each IO interface 24 and 26 may include a plurality of IO registers 28 and 30.

The processing module 12 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-16.

In an example of operation, one or more of the IO interfaces receives an instruction to display a video file. The video file may be from a DVD, stored in the hard disk and/or flash memory, received from a satellite receiver, received from a cable set top box, and/or any other source of video content data. Note that the one or more of the IO interfaces 24 and/or 26 may receive the video file. The video file is encrypted using a particular encryption program and one or more cryptographic keys as prescribed by one or more video standards.

In this example, the processing module 12 coordinates the retrieval of the video file from the main memory 16, the hard disk and/or flash memory 22, the IO interface 24 and/or 26, and/or other source. The encrypted video file may include video data, audio data, video graphics data and/or any other type of data requiring security. The processing module 12 evokes a cryptographic client algorithm (e.g., RSA, DES, etc.) and retrieves a cryptographic key from a secure memory location (e.g., a privileged memory). The secure memory location will be described below with reference to one or more of FIGS. 2-16.

The processing module 12 decrypts the encrypted data using the cryptographic client algorithm and the cryptographic key to produce decrypted data. The decrypted data is provided the graphics processing module 18. The video graphics processing module 18 may be a video graphics card, a video graphics engine, a video graphics processor, a combination thereof, and/or any other device for rendering video data. In this example, the graphics processing module 18 converts the decrypted data into video data and stores it in the graphics memory 20 for subsequent display.

The video graphics display device 10 has three classes of memory access. The most secure class allows access to the system memory (e.g., main memory 16 and/or the hard disk and/or flash memory 22) and to IO devices via the IO interfaces 24 and 26; allows access to the graphics memory 20 (e.g., frame buffer); and allows access to the secure memory location. The next level of secure access allows access to the system memory and to IO devices via the IO interfaces 24 and 26. The third access level allows access to system memory.

Figure 2:
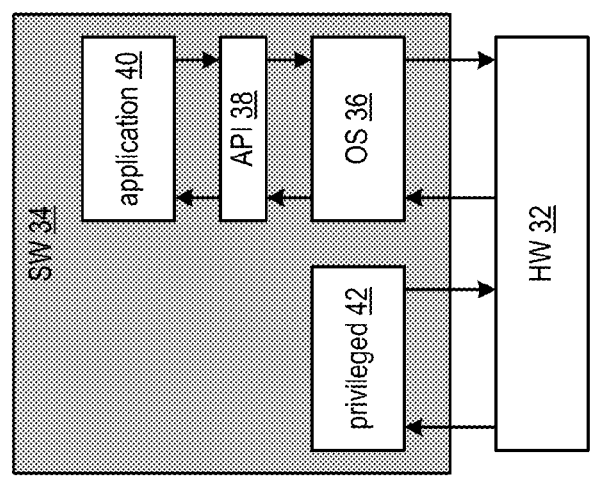
FIG. 2 is a schematic block diagram of an embodiment of a device in accordance with the present invention.

FIG. 2 is a schematic block diagram of an embodiment of a device that includes a hardware (HW) section 32 (e.g., the processing module 12, the memory switch 14, the graphics processing module 18, IO interfaces 24 and 26, etc.) and a software (SW) section 34 that is stored in the system memory (e.g., main memory 16 and/or the hard disk and/or flash memory 22). The software section 34 includes one or more operating systems (OS) 36, application programming interface (API) section 38, an application section 40, and a privileged section 42. The software section 34 may be stored in the memory of device (e.g., the main memory 16, the graphics memory 20, the hard disk/flash memory 22, and/or the IO registers 28 and 30 of device 10). The privileged memory section 42 may be within the memory of the device and/or within a one-time programmable memory.

Figure 3:
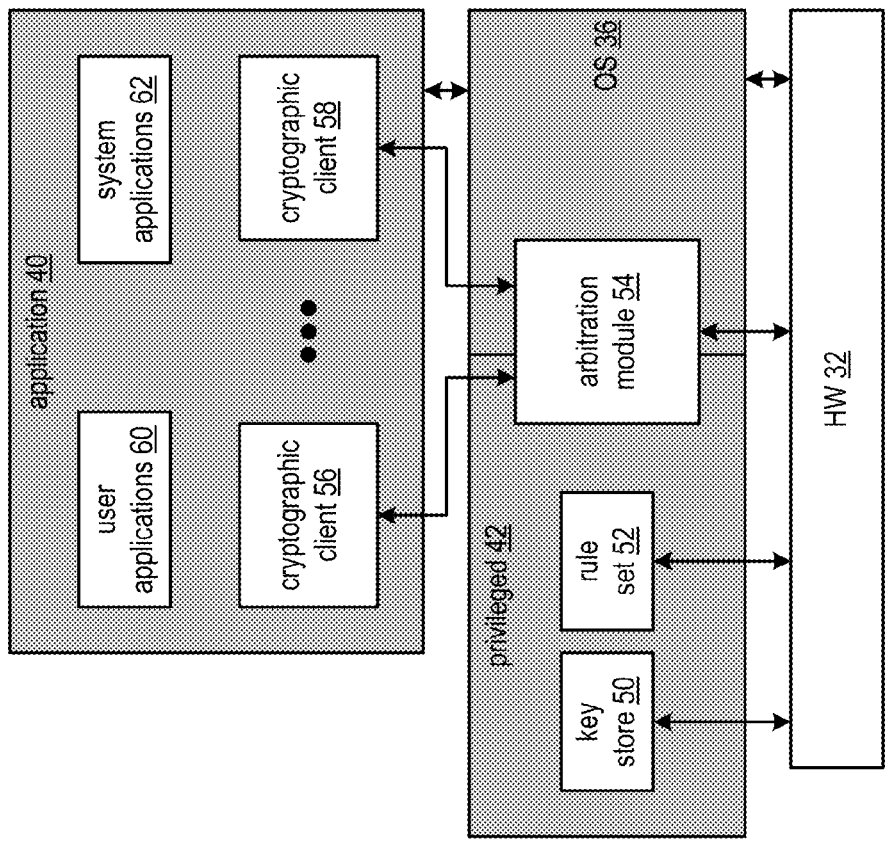
FIG. 3 is a schematic block diagram of another embodiment of a device in accordance with the present invention.

FIG. 3 is a schematic block diagram of another embodiment of a device that includes the hardware section (HW) 32 and the software section (SW) 34. In this embodiment, the software section 34 includes application section 40, an operating system 36, and the privileged section 42. The application section 40 includes a plurality of user applications 60, a plurality of system applications 62, and a plurality of cryptographic client applications 56-58. The plurality of cryptographic applications includes two or more of AES (advanced encryption standard), DES (data encryption standard), 3DES, Multi-2 encryption, DVB (digital video broadcasting), C2 (cryptomeria cipher), CSS (content scramble system), MDMI (HDCP), 1394(M6), RSA, ECC (elliptical curve cryptography), Register, any variations thereof, any further versions thereof, and/or any new encryption standards or techniques.

The privileged memory section 42 may be implemented using one or more one-time programmable (OTP) memories, RAM, and/or ROM. The OTP memory may be used to store a default set of the cryptographic keys and a rule set section 52. The key store section 50 stores one or more cryptographic keys for one or more of the cryptographic clients in an OTP memory, RAM, and/or ROM. The key store section 50 may include memory blocks, where one or more blocks store a cryptographic key. The rule set section 52 stores rules for accessing the key store section 50. The various rules will be described in greater detail with reference to at least some of FIGS. 4-16.

The device of FIG. 3 also includes an arbitration module 54, which may be part of the operation system 36, stored in the privileged memory 42, and/or a separate module (e.g., a stand-alone state machine, a stand-alone processor, etc.). Regardless of its location, the arbitration module coordinates access to the key store section 50 based on the rule set. In this manner, access requests must come from authorized firmware components (e.g., real cryptographic clients) and the request must be in a specific manner based on the identity of the requestor as delineated in the rule set. If either fails (e.g., unauthorized requestor (e.g., firmware being manipulated by a hacker) or invalid request manner), the arbitration module 54 will deny the request, ignore the request, or provide random data in response to the request.

With such an embodiment, the security of a hardware system and the flexibility of a software system are substantially achieved. For instance, by utilizing a single OTP to store permanent rules for accessing the keys, the vulnerability of a software system is substantially avoided and the inflexibility of a hardware system, which uses hard wired single function for a single standard, is also substantially avoided.

Figure 4:
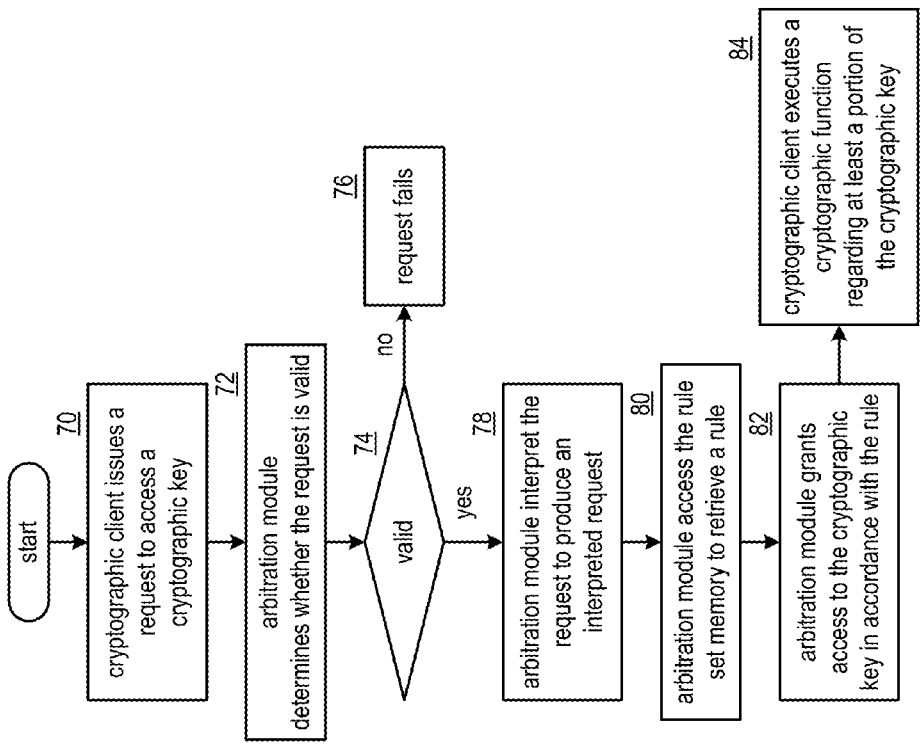
FIG. 4 is a logic diagram of an embodiment of a method for accessing a cryptographic key in accordance with the present invention.

FIG. 4 is a logic diagram of an embodiment of a method for accessing a cryptographic key that begins at step 70 where a cryptographic client issues a request to access a cryptographic key of the cryptographic keys. The request should be in a specific format that includes a read/write indication, an address of the at least a portion of the cryptographic key, a source or destination of the cryptographic result, and identification of a cryptographic algorithm corresponding to the cryptographic function if the source is adjacent to the destination and is the key store content is a Key/CW or an IV. The method then proceeds to step 72 where a key store arbitration module 54 determines whether the request to access the cryptographic key is valid. For example, if the request is not from an authorized entity (e.g., firmware implementing a function such as a cryptographic client), the arbitration module will indicate that the request is not valid. As such, a hacker's attempt to access the key store section will be invalid and will fail as shown at step 76.

If, however, at step 74 the request is determined to be valid, the method continues at step 78 where the arbitration module interprets the request for access to the cryptographic key to produce an interpreted request. This will be described in greater detail with reference to FIG. 9. The method continues at step 80 where the arbitration module accesses the rule set memory based on the interpreted request to retrieve a rule of the set of rules. An example of a rule will be described with reference to FIG. 6.

The method continues at step 82 where the arbitration module grants access to the cryptographic key in accordance with the rule. Note that the rule set may indicate that the access is not to be granted, as such, in accordance with the rule includes denying the request, ignoring the request, or providing random data. The method continues at step 84 where, when access to the cryptographic key is granted, the cryptographic client executes a cryptographic function regarding at least a portion of the cryptographic key to produce a cryptographic result.

Figure 5:
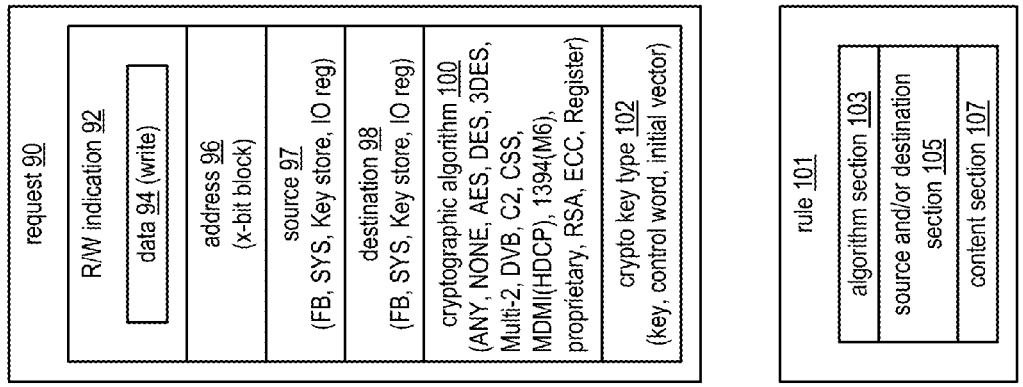
FIG. 5 is a diagram of an example of a request in accordance with the present invention.

FIG. 5 is a diagram of an example of a request 90 that includes a read/write (R/W) indication 92, an address 96, a source 97, a destination 98, identity of the cryptographic algorithm 100 (e.g., ID of the cryptographic client), and the cryptographic key type. If the R/W indication 92 is for write request, the request will also include the data 94 (e.g., a cryptographic key, a code word, or an initial vector) to be written. The address section 96 indicates the starting address of a block of x-bits (e.g., 64 bits).

The source section 97 indicates an initiator of the cryptographic result and the destination section 98 indicates where the cryptographic result will be sent. The valid sources and destinations include the system main memory, the key store section, the IO registers, and/or the graphics memory. The cryptographic algorithm being used may be identified as ANY, NONE, AES, DES, 3DES, Multi-2, DVB, C2, CSS, MDMI (HDCP), 1394(M6), RSA, ECC, and/or Register.

In an embodiment, an adjacent rule may be used. For instance, when a particular client initiates an encryption operation, the Rule Store determines what Key blocks in the Key Store can be accessed. By the improvement a further bit is included in the Rules whereby when the Rule is implemented, it determines the order in which the Key Store blocks may be accessed. More restrictively, a particular sequence of blocks is prescribed. Less restrictively, groups of Key Store blocks are accessed in a prescribed order.

Figure 6:
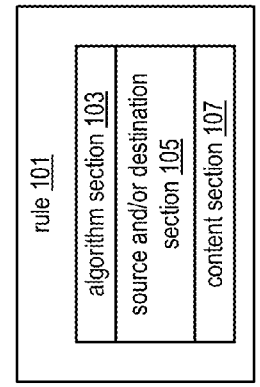
FIG. 6 is a diagram of an example of a rule in accordance with the present invention.

FIG. 6 is a diagram of an example of a rule 101 of a set of rules. The rule 101 includes an algorithm section 103, a source and destination section 105, and a content section 107. The algorithm section 103 identifies a valid algorithm that is entitled to access the key store section via a read request and/or a write request. For the given algorithm and request, the destination section 105 indicates one or more valid destinations that this algorithm may send its cryptographic result. The content section 107 identifies a valid cryptographic key type (e.g., a cryptographic key, a control word, and/or an initial vector).

In an embodiment, the rule store section 52 contains bit masks associated to Key Store blocks. The Bit Mapping for rules is as follows:

| Field | |
|---|---|
| Read Algorithm | See Algorithm List |
| Write Algorithm: | See Algorithm List |
| Destination | 110b = FB |
| | 101b = SYS, /IO |
| | 011b = Key_Store |
| | 000b = no output |
| Content Type | 1b = CW or Key |
| | 0b = IV |
| Source | 110b = FB |
| | 101b = SYS, /IO |
| | 011b = Key_Store |
| | 000b = no output |
| Adjacent | 0 = unrestricted, |
| | 1 = must be Adjacent |

Note:
if Algorithm = ANY then Bits {8, . . . , 15} are the rule is ignored.

| Algorithm | Description |
|---|---|
| ANY | Any Algorithm is permitted (note 00000b = OTP default). |
| AES | ECB, CBC, CTR, OFB, CFB |
| CSS | |
| DES, 2DES | ECB, CBC |
| 3DES | ECB, CBC |
| Multi-2 | |
| DVB | |
| C2 | |
| MDMI (HDCP) | |
| RSA | |
| ECC | |
| Register I/F | Register Interface |
| Reserved | |
| Reserved | |
| NONE | No Algorithm may access block. |

In this embodiment, a rule is a group of bits (e.g., 16) which dictates how a corresponding block (e.g., 64 bits) in the key store may be accessed. By default, since all bits in the OTP default to 0, the blocks that have un-initialized rules provide unlimited access (i.e. no restrictions).

With respect to an adjacent rule: it provides certain cryptographic clients the ability to write the result of a cryptographic operation back into the key store 50. This is may be useful in cases where the security system makes use of key ladders (e.g., a structure where a key is used to decrypt an encrypted key, the resulting decrypted key may then be used in a subsequent key ladder step or it may be used to decrypt content) and where the key is used to decrypt content is itself the end product of several cryptographic operations. In this context, the adjacent rule is used to enforce a particular order to be adhered to when deriving the key (i.e. the $1^{st}$ key must be adjacent to step 1 which must be adjacent to step 2, etc. . . . ) where the last step of the ladder culminates with the key intended to decrypt content. Note that the adjacent rule field more than 1 bit to indicate a range of adjacent locations (e.g., 5 bits to provide 32 adjacent locations). For example, instead of the result or an operation being permitted to be written to just the next (i.e. adjacent) location the rule has extra bits allocated that define the permission to write the result to the next N blocks (i.e. a plurality of adjacent locations). This adds flexibility when dealing with a multi stream system where multiple end keys are calculated using the same ladder.

Figure 7:
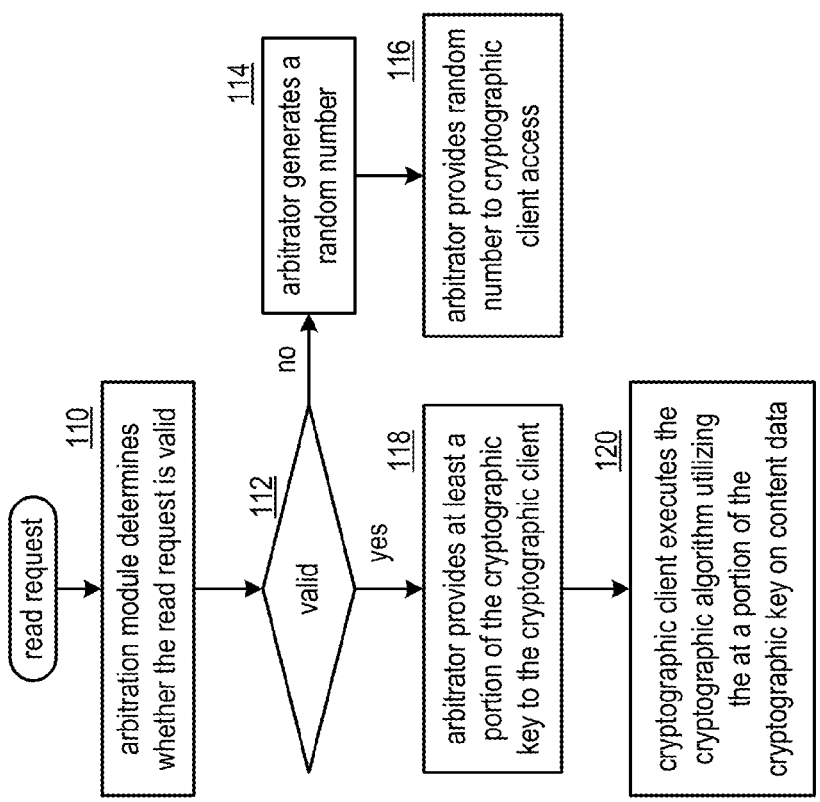
FIG. 7 is a logic diagram of an embodiment of a method for processing a read access request to a cryptographic key in accordance with the present invention.

FIG. 7 is a logic diagram of an embodiment of a method for processing a read access request to a cryptographic key that begins at step 110 where the key store arbitration module determines whether the request to read the cryptographic key is valid. This may be done by determining whether the requestor is authorized to make a request or in accordance with the rule set. If, at step 112, it is determined that the request is not valid, the method continues at step 114 where the arbitration module return a random number. The method then continues at step 116 where the arbitration module provides the cryptographic client access to the random number.

If the request is valid, the method continues at step 118 where the arbitration module provides at least a portion of the cryptographic key to the cryptographic client. For example, the key may be stored in multiple blocks and the arbitration module provides some or all of the blocks the cryptographic client in response to one request. The method continues at step 120 where the cryptographic client executes the cryptographic algorithm utilizing the at least a portion of the cryptographic key on content data to produce encrypted data or decrypted data. Note that, in an embodiment, even though a cryptographic client may make multiple requests and get portions of the key, it typically will use the entire key for a cryptographic operation.

Figure 8:
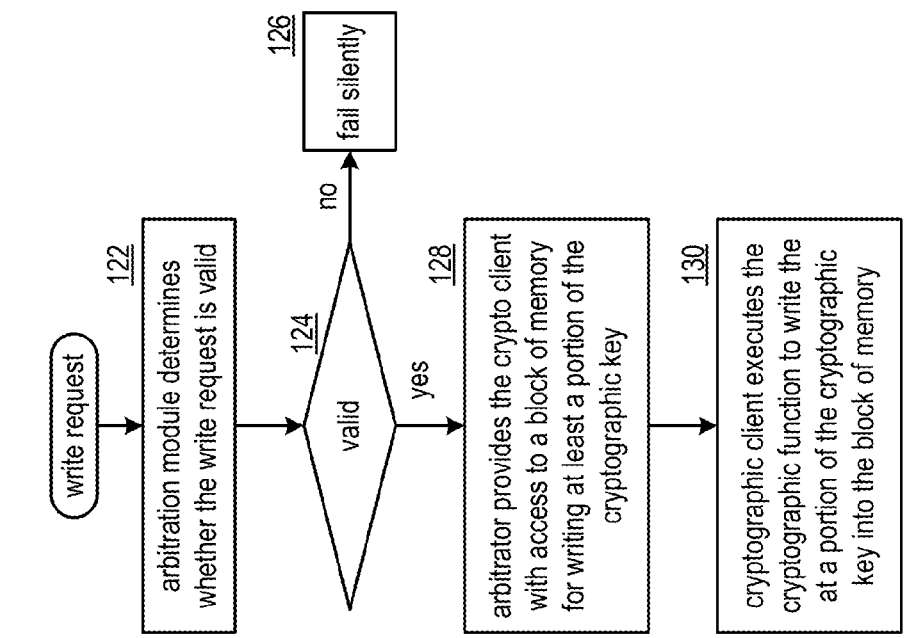
FIG. 8 is a logic diagram of an embodiment of a method for processing a write access request to a cryptographic key in accordance with the present invention.

FIG. 8 is a logic diagram of an embodiment of a method for processing a write access request to a cryptographic key that begins at step 122 where the arbitration module determines whether the request to write the cryptographic key is valid. This may be done in accordance with a rule of the rule set. If, at step 124 it is determined that the request is not valid, the method continues at step 126 where the request fails silently (e.g., no response is given, the request is ignored), or an error status is provided.

If, however, the request is valid, the method continues at step 128 where the arbitration module provides access to a block of memory in the key store memory for the at least a portion of the cryptographic key for the cryptographic client. The method continues at step 130 where the cryptographic client executes the cryptographic function to write the at least a portion of the cryptographic key into the block of memory.

Figure 9:
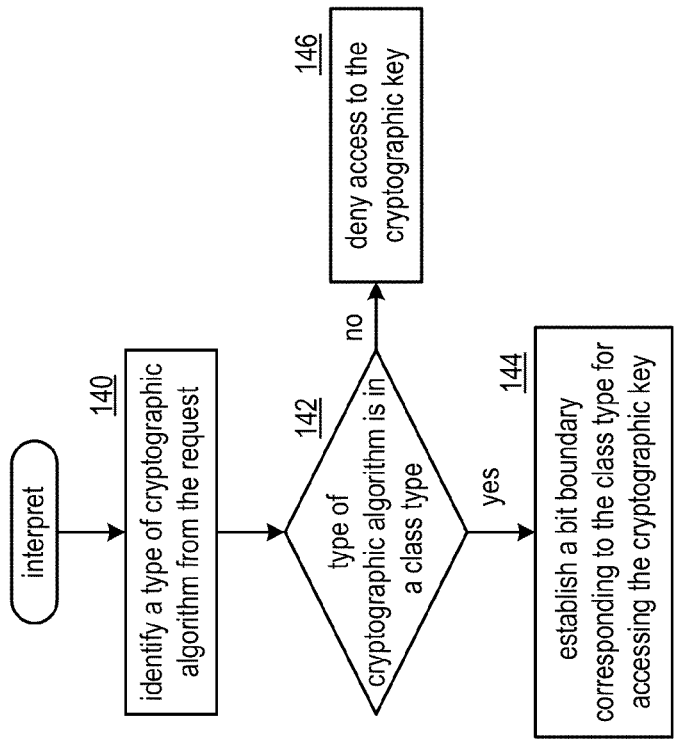
FIG. 9 is a logic diagram of an embodiment of a method for interpreting a request to a cryptographic key in accordance with the present invention.

FIG. 9 is a logic diagram of an embodiment of a method for interpreting a request to a cryptographic key that begins at step 140 where the arbitration module identifies a type of cryptographic algorithm from the request to access the cryptographic key. For example, cryptographic algorithms may be grouped into type categories. As a specific example, a first type may include ANY, DES, DVB, C2, CSS, M6, Multi-2, HDCP, Register; a second type may include AES, 3DES, ECC; a third type may include RSA; and a fourth type many include NONE.

The method branches at step 142 depending on whether the type of cryptographic algorithm is in a class type of a plurality of class types. If not, the method continues at step 146 where the request is denied. If, however, the type is in a class, the method continues at step 144 where the arbitration module establishes a bit boundary corresponding to the class type for accessing the cryptographic key. For example, If Algorithm={ANY, DES, DVB, C2, CSS, M6, Multi-2, HDCP, Register} then the Key Store may be accessed on a 64 bit boundary; If Algorithm={AES, 3DES, ECC} then the Key Store may be accessed on a 128 bit boundary; If Algorithm={RSA} then the Key Store may be accessed on a 1024 bit boundary; and If Algorithm={NONE} then the Key store may be not be accessed on any boundary.

Figure 10:
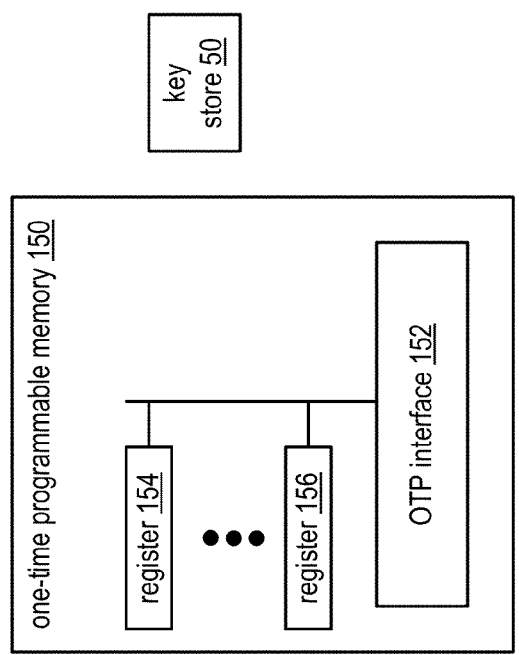
FIG. 10 is a diagram of an example of a one-time programmable memory in accordance with the present invention.

FIG. 10 is a diagram of an example of a one-time programmable memory 150 that includes an OTP interface 152, and a plurality of registers associated with the key store 50. In an embodiment, the OTP area (16K bits) is used to record Keys, CWs and IVs and various other values organized as 256 blocks of 64 bits each.

There is an OTP programming Interface which corresponds to a set of registers which permit reading or write 64 bits at a time into a specific OTP block. For every block there are 2 bits of associated OTP memory (i.e. the Read Lock Out Bits {0, . . . 255} and the Write Lock Out Bits {0, . . . 255}. These bits default to =0 (factory default) and may be programmed one time to =1. Once the bit is set to =1 it may never be re-programmed to a=0. When the corresponding read lock out bit is set form a=0 to a=1 then the associated 64 bit OTP block may never be read via the register interface. When the corresponding write lock out bit is set form a=0 to a=1 then the associated 64 bit OTP block may never be written via the register interface.

This is a fundamental interlock required to secure secret values into the hardware device. There are a few scenarios;

| Read Lock Out | Write Lock Out | Use Case |
| --- | --- | --- |
| 0 | 0 | In this case a block of OTP may be left completely unlocked and may be programmed in the field or at the factory with non security critical information. |
| 0 | 1 | In this case a block of OTP may be write protected but not read protected. A typical use for this scenario is to record a MAC address which is not secure (i.e. may be read) but should not be overwritten. |
| 1 | 0 | In this case a block of OTP is read protected but left write able. A typical scenario for this is to provide a mechanism to revoke a system i.e. allow a Key to be over written in the field. |
| 1 | 1 | I this case a block of OTP is read and write protected. A typical scenario for this is to record keys within the OTP and disable f/w form ever reading or overwriting the key. |

Note that even if an OTP block's read write lock out bits are set the block may still be used by a cryptographic client within the hardware device (i.e. H/W blocks may use the key values to perform a cryptographic operation but the value itself may never be exposed).

During the initial writing the cryptographic key to the key store memory at step 50 from the OTP, the copy may utilize an obfuscation function. For example, blocks of 64 bits (i.e. Block[j]) which are to be written to the OTP (i.e. OTP[i]) are obfuscated using a function comprising symmetric binary operators (OP[n]) and a re-mapping function (i.e. [j]→[i]→[j]). The obfuscation function h( ) may be defined as follows:

$$OTP[i] = HKB[x] OP[y] Block[z]$$

The corresponding reverse-obfuscation function $h^{-1}( )$ implemented between the OTP and the Key Store uses the following obfuscation function.

$$KeyStore[z] = OTP[i] OP^{-1}[y] HKB[x]$$

Note that h( ) is a [j]op[j]→[i] mapping and $h^{-1}( )$ is a [i]op [j]→[j] mapping which means that the bit ordering in the Block[ ] and the HKB[ ] are different i.e. if a hacker had access to the Block value and the HKB value then the bit ordering would not correspond.

An obfuscation key block may be a 64 bit pattern written into one or more blocks of the OTP. The obfuscation key block may default to 0x0 . . . 0 and may be programmed uniquely per chip, or uniquely per customer, or uniquely per product or may default to 0x0 . . . 0. In addition, the obfuscation key block should have a similar number of 0's as 1's (+/−10%) (i.e. non trivial value) to ensure secure obfuscation.

The obfuscation functions may be used to secure the key store loading stage of secure key deployment. It allows for a secure way to embed keys in to OTP memory. This provides an important operational security mechanism which secures cryptographic values within the OTP and provides some security in the factory environment.

Figure 11:
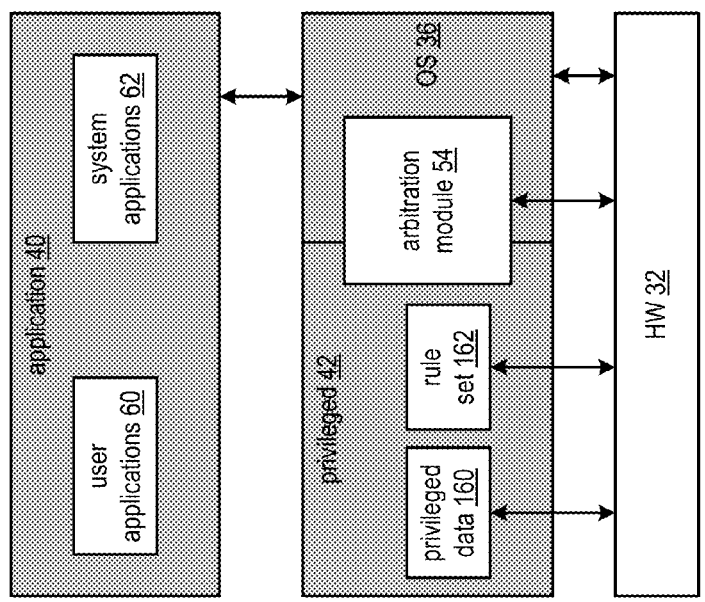
FIG. 11 is a schematic block diagram of another embodiment of a device in accordance with the present invention.

FIG. 11 is a schematic block diagram of another embodiment of a device that includes the hardware section (HW) 32 and the software section (SW) 34. In this embodiment, the software section 34 includes application section 40, an operating system 36, and the privileged section 42. The application section 40 includes a plurality of user applications 60 and a plurality of system applications 62.

The privileged memory section 42, which may be implemented using one or more one-time programmable memories, includes a privileged data section 160 and a rule set section 1622. The privileged data section 160 stores data that is of a privileged nature and should not be accessible to a user of the device or to a hacker. Such data includes one or more cryptographic keys for one or more of the cryptographic clients, other device security features, etc. The privileged data section 160 may include memory blocks, where one or more blocks store a privileged data element. The rule set section 162 stores rules for accessing the privileged data section 160.

The device of FIG. 11 also includes an arbitration module 54, which may be part of the operation system 36, stored in the privileged memory 42, and/or a separate module (e.g., a stand-alone state machine, a stand-alone processor, etc.). Regardless of its location, the arbitration module coordinates access to the privileged data section 160 based on the rule set. In this manner, access requests must come from authorized firmware components (e.g., real cryptographic clients, operating system firmware functions, other device security functions, etc.) and the request must be in a specific manner based on the identity of the requestor as delineated in the rule set. If either fails (e.g., unauthorized requestor (e.g., firmware being manipulated by a hacker) or invalid request manner), the arbitration module 54 will deny the request, ignore the request, or provide random data in response to the request.

Figure 12:
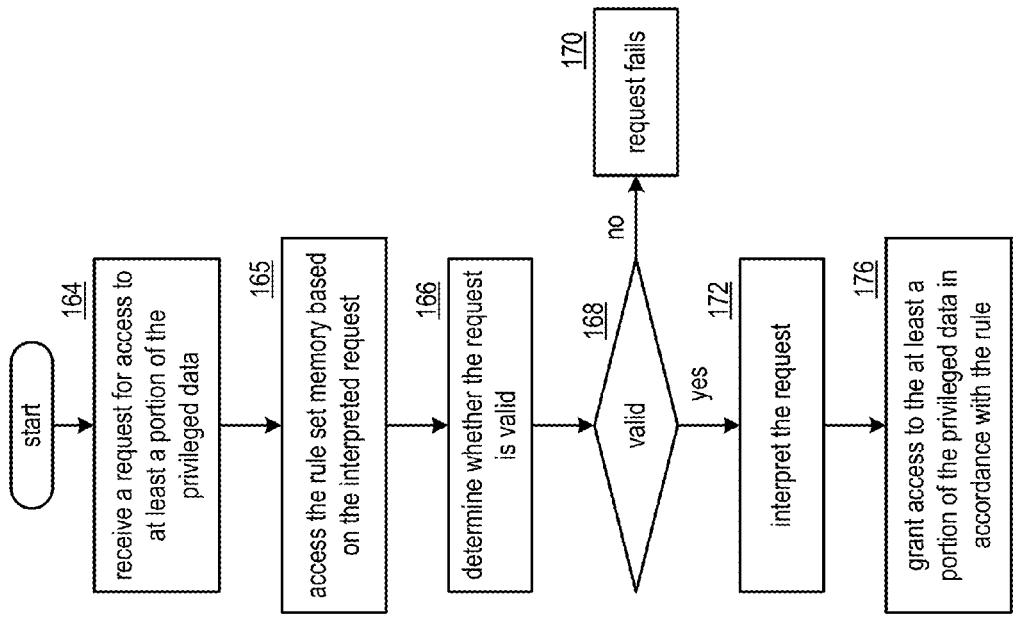
FIG. 12 is a logic diagram of an embodiment of a method for accessing privileged memory in accordance with the present invention.

FIG. 12 is a logic diagram of an embodiment of a method for accessing privileged memory that begins at step 164 where the arbitration module receives a request for access to at least a portion of the privileged data. The method continues at step 165 where the arbitration module accesses the rule set memory based on the interpreted request to retrieve a rule of the set of rules. Note that a rule of the set of rules includes an algorithm section that identifies one or more valid algorithms, a destination section that identifies a valid destination, and a content section that identifies a valid privileged data type.

The method continues at step 166 where the arbitration module determines whether the request is valid. This may be done by accessing the rule set based on the requestor and the type of request (e.g., read privileged data and/or to write privileged data). In addition, the arbitration module may verify the format of the request to insure that includes a read/write indication, an address of the at least a portion of the privileged data, and an indication regarding use of the privileged data. If any of these checks fail, the request is invalid and the method proceeds to step 170 via step 168, where the request fails. If, however, the request is valid, the method continues at step 172 where the arbitration module interprets the request to produce an interpreted request. The interpretation will be described in greater detail with reference to FIG. 15. The method continues at step 176 where the arbitration module grants access to the at least a portion of the privileged data in accordance with the rule.

Figure 13:
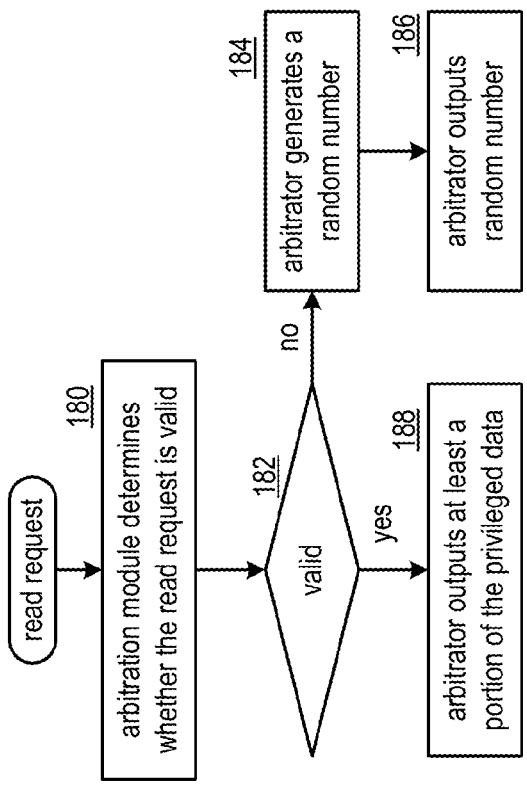
FIG. 13 is a logic diagram of an embodiment of a method for processing a read request to access privileged memory in accordance with the present invention.

FIG. 13 is a logic diagram of an embodiment of a method for processing a read request to access privileged memory that begins at step 180 where the arbitration module determines whether the request to read is valid. This may be done by accessing an appropriate rule from the rule set. The method branches at step 182 depending on whether the request is valid. If not, the method continues at step 184 where the arbitration module generates a random number. The method continues at step 186 where the arbitration module outputs the random number as the at least a portion of the privileged data. When the request to read is valid, the method continues at step 188 where the arbitration module outputs the at least a portion of the privileged data.

Figure 14:
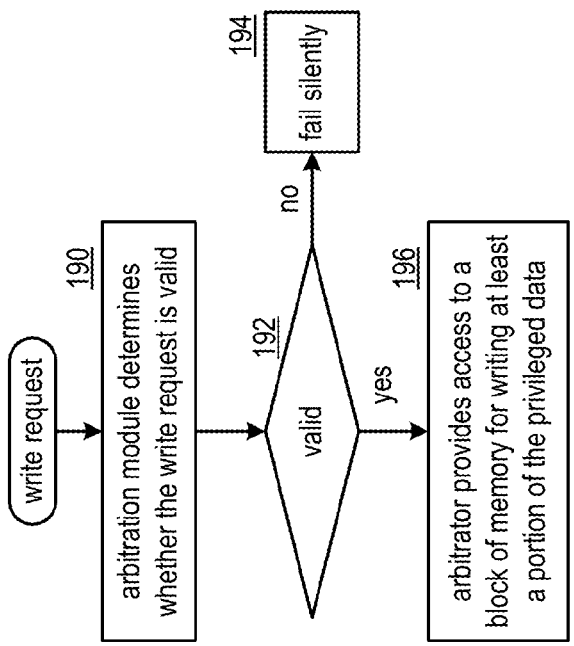
FIG. 14 is a logic diagram of an embodiment of a method for processing a write request to access privileged memory in accordance with the present invention.

FIG. 14 is a logic diagram of an embodiment of a method for processing a write request to access privileged memory that begins at step 190 where the arbitration module determines whether the request to write is valid. This may be done by accessing an appropriate rule from the rule set. The method branches at step 192 depending on whether the request is valid. If not, the request fails silently at step 194. When the request to write is valid, the method continues at step 196 where the arbitration module provides access to a block of memory in the privileged memory for the at least a portion of the privileged data.

Figure 15:
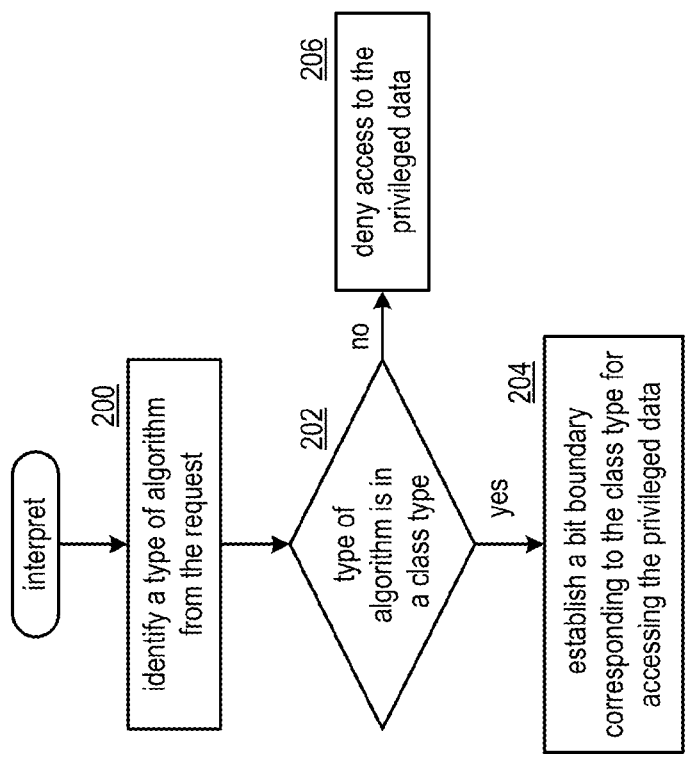
FIG. 15 is a logic diagram of an embodiment of a method for interpreting a request to access privileged memory in accordance with the present invention.

FIG. 15 is a logic diagram of an embodiment of a method for interpreting a request to access privileged memory that begins at step 200 where the arbitration module identifies a type of algorithm from the request (e.g., a system level application, an operating system function, a cryptographic algorithm, etc.). The method continues at step 202 where the arbitration module determines whether the type of algorithm making the current request is within one of the types of algorithms. When it is not, the method continues at step 206 where the request is denied. When the type of algorithm is in a class type of a plurality of class types, the method continues at step 204 where the arbitration module establishes a bit boundary corresponding to the class type. For example, a first class may access the privileged memory a block at a time, a second class may access the privileged memory x-blocks at a time, etc.).

Figure 16:
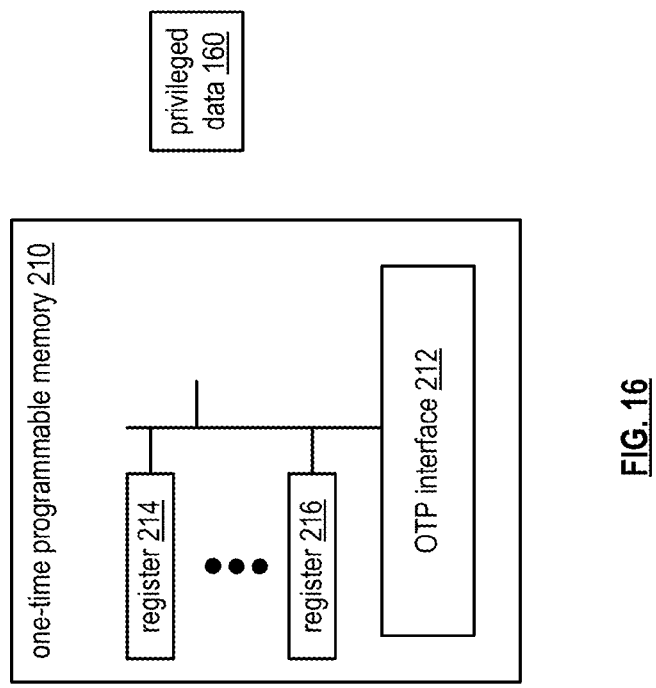
FIG. 16 is a diagram of another example of a one-time programmable memory in accordance with the present invention.

FIG. 16 is a diagram of another example of one or more one-time programmable memories 210 that includes the privileged data section 1600, an OTP interface 212, and a plurality of registers 214-216. In an embodiment, the OTP area (16K bits) is used to record Keys, CWs and IVs and various other values organized as 256 blocks of 64 bits each. There is an OTP programming Interface which corresponds to a set of registers which permit reading or write 64 bits at a time into a specific OTP block. For every block there are 2 bits of associated OTP memory (i.e. the Read Lock Out Bits {0, . . . 255} and the Write Lock Out Bits {0, . . . 255}. These bits default to =0 (factory default) and may be programmed one time to =1. Once the bit is set to =1 it may never be re-programmed to a=0. When the corresponding read lock out bit is set form a=0 to a=1 then the associated 64 bit OTP block may never be read via the register interface. When the corresponding write lock out bit is set form a=0 to a=1 then the associated 64 bit OTP block may never be written via the register interface.

A further embodiment may include an additional multi-bit field for encrypt/decrypt that specifies whether a cryptographic client is required to perform an encrypt or decrypt operation (e.g., ANY=00, Encrypt=10, Decrypt=01, NONE=11). A least constraining state is the 00 (un-programmed state) and a most constraining state is 11 (None). Another embodiment may include increasing the size of the read and write algorithm field from 4 bits to 6 bits to specify 64 different algorithms, which allows for many more algorithms to be added.

In another embodiment, a skip function may be used to reduce the number of one time programming (OTP) steps required to populate the Key Store by loading one root key into the Key Store and then having the keys for other sections of the key ladder calculated from the root rather than having them all loaded during successive steps of the OTP process. In this way, certain OTP steps are obviated.

In yet another embodiment, a repeat function may be used to avoid redundancy. For instance, the OTP block includes an indicator stored with certain of the Rules in the Rule Store to indicate whether that Rule is to be repeated to load it in other locations in the Key Store ladder. Once again, this obviates the requirement of having an OTP step for every location in the Key Store ladder.

In a further embodiment, an Encrypt/Decrypt rule may be used. In particular, a pair of bits are added to each Rule which signify that the client can encrypt and decrypt (00), that the client can do one of encrypt and decrypt (1,0) and (0,1), and that the client can copy, but not encrypt or decrypt, the result to another location in the Key Store.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform, when activated, one or more of its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A device comprises:
   a key store memory operable to store a plurality of cryptographic keys and a plurality of control words;
   a rule set memory operable to store a set of rules for accessing the key store memory;
   a plurality of cryptographic clients, wherein a cryptographic client of the plurality of cryptographic clients is operable to issue a request to access a control word of the plurality of control words; and
   a key store arbitration module operable to:
      determine whether the request to access the control word is valid;
      when the request to access the control word is valid, interpret the request for access to the control word to produce an interpreted request;
      access the rule set memory based on the interpreted request to retrieve a rule of the set of rules; and
      grant access to the control word in accordance with the rule.

2. The device of claim 1 wherein the request to access the control word includes a read request.

3. The device of claim 2 wherein, when access to the control word is granted, the cryptographic client of the plurality of cryptographic clients is further operable to execute a cryptographic function regarding at least a portion of the control word to produce a cryptographic result.

4. The device of claim 1 wherein the request to access the control word includes a write request.

5. The device of claim 1 wherein the cryptographic client of the plurality of cryptographic clients is further operable to issue an access request to access a cryptographic key of the plurality of cryptographic keys in response to a decryption request.

6. The device of claim 5 wherein the request to access the cryptographic key includes a read request.

7. The device of claim 6 wherein, when access to the cryptographic key is granted, the cryptographic client of the plurality of cryptographic clients is further operable to execute a cryptographic function to decrypt at least a portion of an encrypted filed using at least a portion of the cryptographic key.

8. The device of claim 5 wherein the request to access the cryptographic key includes a write request.

9. The device of claim 5, wherein the key store arbitration module is further operable to:
   determine whether the request to access the cryptographic key is valid.

10. The device of claim 9 wherein, when the request to access the cryptographic key is valid, the key store arbitration module is further operable to:
    access the rule set memory to retrieve another rule of the set of rules; and
    grant access to the cryptographic key in accordance with the another rule.

11. A device comprises:
    a key store memory operable to store a plurality of cryptographic keys and a plurality of initial vectors;
    a rule set memory operable to store a set of rules for accessing the key store memory;
    a plurality of cryptographic clients, wherein a cryptographic client of the plurality of cryptographic clients is operable to issue a request to access an initial vector of the plurality of initial vectors; and
    a key store arbitration module operable to:
       determine whether the request to access the initial vector is valid;
       when the request to access the initial vector is valid, interpret the request for access to the initial vector to produce an interpreted request;
       access the rule set memory based on the interpreted request to retrieve a rule of the set of rules; and
       grant access to the initial vector in accordance with the rule.

12. The device of claim 11 wherein the request to access the initial vector includes a read request.

13. The device of claim 12 wherein, when access to the initial vector is granted, the cryptographic client of the plurality of cryptographic clients is further operable to execute a cryptographic function regarding at least a portion of the initial vector to produce a cryptographic result.

14. The device of claim 11 wherein the request to access the initial vector includes a write request.

15. The device of claim 11 wherein the cryptographic client of the plurality of cryptographic clients is further operable to issue an access request to access a cryptographic key of the plurality of cryptographic keys in response to a decryption request.

16. The device of claim 15 wherein the request to access the cryptographic key includes a read request.

17. The device of claim 16 wherein, when access to the cryptographic key is granted, the cryptographic client of the plurality of cryptographic clients is further operable to execute a cryptographic function to decrypt at least a portion of an encrypted file using at least a portion of the cryptographic key.

18. The device of claim 15 wherein the request to access the cryptographic key includes a write request.

19. The device of claim 15, wherein the key store arbitration module is further operable to:
    determine whether the request to access the cryptographic key is valid.

20. The device of claim 19 wherein, when the request to access the cryptographic key is valid, the key store arbitration module is further operable to:
    access the rule set memory to retrieve another rule of the set of rules; and
    grant access to the cryptographic key in accordance with the another rule.

* * * * *